(12) United States Patent
Berookhim et al.

(10) Patent No.: US 11,849,423 B2
(45) Date of Patent: Dec. 19, 2023

(54) SYSTEMS AND METHODS FOR UPDATING SUBSETS BASED ON CHANGING OF PROXIMITY AND TIME

(71) Applicants: Elliot Berookhim, Los Angeles, CA (US); Pejman Yedidsion, Los Angeles, CA (US)

(72) Inventors: Elliot Berookhim, Los Angeles, CA (US); Pejman Yedidsion, Los Angeles, CA (US)

( * ) Notice: Subject to any disclaimer, the term of this patent is extended or adjusted under 35 U.S.C. 154(b) by 123 days.

(21) Appl. No.: 17/667,482

(22) Filed: Feb. 8, 2022

(65) Prior Publication Data
US 2022/0256495 A1 Aug. 11, 2022

Related U.S. Application Data

(60) Provisional application No. 63/147,192, filed on Feb. 8, 2021.

(51) Int. Cl.
| | |
|---|---|
| *H04W 64/00* | (2009.01) |
| *H04W 4/23* | (2018.01) |
| *H04W 4/029* | (2018.01) |
| *G06Q 30/0251* | (2023.01) |

(52) U.S. Cl.
CPC ......... *H04W 64/003* (2013.01); *H04W 4/029* (2018.02); *H04W 4/23* (2018.02); *G06Q 30/0261* (2013.01)

(58) Field of Classification Search
CPC ....... H04W 4/029; H04W 4/02; H04W 64/00; H04W 4/021; H04W 4/023; H04W 84/12; H04W 40/248; H04W 64/006; H04W 4/024; H04W 4/027; H04W 76/10; H04W 4/60; H04W 40/20; H04W 40/28; H04W 48/04; H04W 52/0251; H04W 64/003; H04W 4/23; G06F 2221/2111; G06Q 30/0261

See application file for complete search history.

(56) References Cited

U.S. PATENT DOCUMENTS

| | | | |
|---|---|---|---|
| 2014/0365307 A1* | 12/2014 | Cheung | G06Q 30/0261 705/14.58 |
| 2015/0278865 A1* | 10/2015 | Jain | H04W 4/021 705/14.52 |
| 2019/0244249 A1* | 8/2019 | Jain | G06Q 30/0254 |

* cited by examiner

*Primary Examiner* — Srilakshmi K Kumar
*Assistant Examiner* — Jing Gao
(74) *Attorney, Agent, or Firm* — Concept IP LLP; Pejman Yedidsion

(57) ABSTRACT

Methods, systems, and devices including transmitting, by a server, a first signal to a set of user equipment; receiving, by a user equipment, the transmitted first signal; transmitting a response indicating whether the user equipment is located within a first specified distance from the provider; determining a subset of user equipment that are within the first specified distance; transmitting a second signal to the determined subset of user equipment; transmitting a third signal to the subset of user equipment; receiving the transmitted third signal while a received countdown timer is still running; transmitting a response indicating whether the user equipment is located within a second specified distance from the provider; determining a second subset of user equipment that are within the second specified distance; and transmitting a fourth signal comprising a second specified amount of time to be added to the previously running countdown timer.

18 Claims, 10 Drawing Sheets

SYSTEMS AND METHODS FOR UPDATING SUBSETS BASED ON CHANGING OF PROXIMITY AND TIME

CROSS-REFERENCE TO RELATED APPLICATIONS

This application claims priority to and the benefit of U.S. Provisional Patent Application No. 63/147,192, filed Feb. 8, 2021, the contents of which are hereby incorporated by reference herein for all purposes.

TECHNICAL FIELD

The application relates to the field of digital media and marketing, more particularly, determining a user's location relative to a destination in order to transmit further communications that are relevant to the user's proximity.

BACKGROUND

Location-based advertising (LBA) is a form of advertising that integrates mobile advertising with location-based services. The technology is used to provide location-specific advertisements on the mobile devices of users using their location.

SUMMARY

A method embodiment may include: transmitting, by a server computing device having a processor and addressable memory, a first signal to a set of user equipment signed up to communicate with the server, where the first signal may be transmitted based on a received request from a provider; receiving, by a user equipment, the transmitted first signal, where the transmitted first signal comprises a location of the provider and a first specified distance; transmitting, by the user equipment to the server computing device, a response indicating whether the user equipment may be located within the first specified distance from the provider; determining, by the server computing device, a subset of user equipment that are within the first specified distance based on the received response; transmitting, by the server computing device, a second signal to the determined subset of user equipment, the signal comprising information about the provider and a specified amount of time to serve as a countdown timer; transmitting, by the server computing device, a third signal to the subset of user equipment, the transmitted third signal comprising the location of the provider and a second specified distance, where the second specified distance may be smaller than the first specified distance; receiving, by each user equipment of the subset of user equipment, the transmitted third signal while the received countdown timer may be still running; transmitting, by each user equipment of the subset of users to the server computing device, a response indicating whether the user equipment may be located within the second specified distance from the provider; determining, by the server computing device, a second subset of user equipment that are within the second specified distance based on the received response and based on the countdown timer of the user equipment not having expired; and transmitting, by the server computing device to each user equipment of the second subset of user equipment, a fourth signal comprising a second specified amount of time to be added to the previously running countdown timer thereby increasing the time to expiration if a user equipment was at a distance from the provider that may be less than the previously reported distance.

Additional method embodiments may include: determining, by the server computing device, an update to the second subset based on determining if the countdown timer has expired for a user equipment and removing that user equipment from the second subset. In additional method embodiments, the update to the second subset ensures the server communicates with users who are within an area that can meet time restrictions of reaching the provider location without knowing where each of the user equipment may be located.

In additional method embodiments, the countdown timer may be a length of time the notification may be to be valid. In additional method embodiments, the first signal comprises a value for amount of time to delay between confirming user equipment proximity to location of provider. Additional method embodiments may include: determining if the user equipment has moved via comparing the first distance to the provider against the second distance to the provider.

A system embodiment may include: a set of user equipment each having a processor and addressable memory; a server computing device having a processor and addressable memory, the processor configured to: transmit a first signal to a set of user equipment signed up to communicate with the server, where the first signal may be transmitted based on a received request from a provider and where the transmitted first signal comprises a location of the provider and a first specified distance; determine a subset of user equipment that are within the first specified distance based on the received response indicating whether the user equipment may be located within the first specified distance from the provider; transmit a second signal to the determined subset of user equipment, the signal comprising information about the provider and a specified amount of time to serve as a countdown timer; transmit a third signal to the subset of user equipment, the transmitted third signal comprising the location of the provider and a second specified distance, where the second specified distance may be smaller than the first specified distance; determine a second subset of user equipment that are within the second specified distance based on the received response indicating whether the user equipment may be located within the second specified distance from the provider and based on the countdown timer of the user equipment not having expired; and transmit to each user equipment of the second subset of user equipment, a fourth signal comprising a second specified amount of time to be added to the previously running countdown timer thereby increasing the time to expiration if a user equipment was at a distance from the provider that may be less than the previously reported distance.

In additional system embodiments, the server computing device may be further configured to: determine an update to the second subset based on determining if the countdown timer has expired for a user equipment and removing that user equipment from the second subset. In additional system embodiments, the update to the second subset ensures the server communicates with users who are within an area that can meet time restrictions of reaching the provider location without knowing where each of the user equipment may be located.

In additional system embodiments, the countdown timer may be a length of time the notification may be to be valid. In additional system embodiments, the first signal comprises a value for amount of time to delay between confirming user equipment proximity to location of provider. In additional system embodiments, the server computing device may be further configured to: determine if the user equipment has moved via comparing the first distance to the provider against the second distance to the provider.

A user equipment device embodiment may include a processor and addressable memory, where the processor may be configured to: receive a transmitted first signal, where the first signal may be transmitted based on a received request from a provider and where the transmitted first signal comprises a location of the provider and a first specified distance; transmit a response to a server computing device indicating whether the user equipment may be located within the first specified distance from the provider; determine whether the user equipment may be part of a subset of equipment if the user equipment may be within the first specified distance; receive a second signal comprising information about the provider and a specified amount of time to serve as a countdown timer and initiate the countdown timer; receive a third signal comprising the location of the provider and a second specified distance, where the second specified distance may be smaller than the first specified distance, while the countdown timer may be still running; transmit a response indicating whether the user equipment may be located within the second specified distance from the provider; determine whether the user equipment may be part of a second subset of user equipment based on if the user equipment may be within the second specified distance and based on the countdown timer of the user equipment not having expired; and receive, if the user equipment may be part of the second subset of user equipment, a fourth signal comprising a second specified amount of time to be added to the previously running countdown timer thereby increasing the time to expiration since the user equipment was at a distance from the provider that may be less than the previously reported distance.

In additional user equipment device embodiments, the user equipment device may be further configured to: transmit a signal to be removed from the second subset based on determining if the countdown timer has expired. In additional user equipment device embodiments, the update to the second subset ensures communication are only with users who are within an area that can meet time restrictions of reaching the provider location without providing user equipment location information.

In additional user equipment device embodiments, the countdown timer may be a length of time the notification may be to be valid. In additional user equipment device embodiments, the first signal comprises a value for amount of time to delay between confirming user equipment proximity to location of provider. In additional user equipment device embodiments, the user equipment device may be further configured to: determine if the user equipment has moved via comparing the first distance to the provider against the second distance to the provider.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
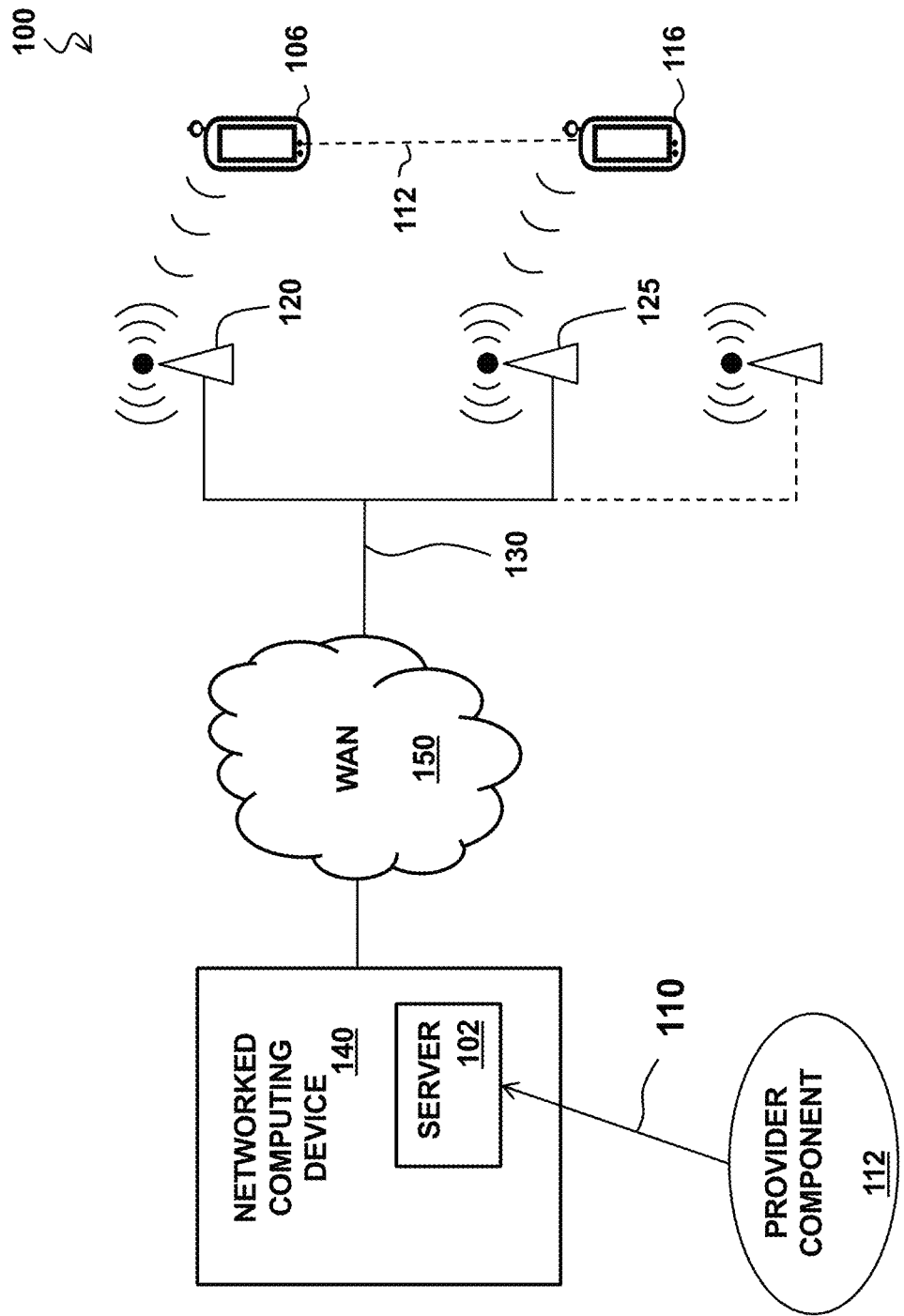
FIG. 1 depicts a system for determining a user's location relative to a destination.

The described technology concerns one or more methods, systems, apparatuses, and mediums storing processor-executable process steps to determine a user's location relative to a destination in relation to a timer in order to transmit further communications that are relevant to the user's proximity.

A system embodiment may include a computing device transmitting a first request to a set of user equipment for an associated distance to a particular location at a particular time and transmitting a second request to a subset of user equipment meeting a criteria for proximity to the particular location for an updated associated distance, and transmitting a communication with a timer value to the user equipment part of the subset of user equipment, where the transmission of the communication is based on whether the updated distance to the particular location is less than the original distance to the particular location and increasing the timer value with every subsequent reduction in the distance to the particular location, if the increased timer value is not greater than a set time limit.

Additionally, the system may remove a user equipment from the subset of user equipment if determined not to have made any movement by way of the distance been reduced at a subsequent request transmission. If the user equipment confirms that they are at a certain location (e.g., place of provider) then a user at the user equipment can redeem an offer contained in the communication. Thereby the system may provide Privacy/Distance/Subset/Timer control.

The disclosed embodiments provide proximity and timer for the localization of wireless distribution of notifications, e.g., advertising content, associated with a particular location or place. That is, transmissions may be received by a set of user equipment within a specified distance of that location having the ability to reach the location within a particular amount of time. Such transmission may be via a traditional localized broadcast, or more commonly, specifically targeted to user equipment devices known to be in a particular area via their proximity to the location. The location of a user equipment device may be determined, for example, by: (a) a cellular phone being in a particular cell or connected to a particular cell tower; (b) a Bluetooth- or Wi-Fi-enabled device being within range of a transmitter; (c) an Internet enabled device with GPS, enabling it to request localized content from Internet servers; (d) an NFC enabled phone programmed to receive radio frequency identification (RFID) information from a chip at a location; and (e) a user equipment storing locally the distance information from a GPS satellite and having been configured to respond to a request from a server. Other location determination methods known in the art may also be used for determining user equipment device location.

A timer is a specialized type of clock used for measuring specific time intervals. Timers may be implemented in a device which counts down from a specified time interval having configuration to give an indication that the time interval that had been set, has expired. Embodiments of the present application provide a proximity measurement, e.g., being nearby or close to a location, combined with a timer counting down a specified time interval. Such embodiments provide proximity information of two or more devices, for example, a set of user equipment (UE), that are near each other or within a predefined distance to a location. Some embodiments provide an environment where a central server, in communication with the set of user equipment, doesn't gather information on either of the user equipment devices or their exact location; the only necessary measurement may be whether or not a particular user equipment from a larger set of user equipment is within a range or distance from a particular location.

Communications may be further targeted to specific groups within a given location, for example, notification or content may only be distributed to user equipment devices being within proximity of a location of a provider where that proximity is to allow the user to get to the location before a timer expires. Therefore, such communications may be both time and place specific, for example, notification or content delivered only to users that are within a specified distance from a venue and amount of time required to reach that venue so to ensure that, for example, the event at the venue is in progress and/or venue is still open.

The present embodiments disclose systems, devices, and methods for determining whether a user at their user equipment, e.g., cell phone, is at a location that is within a distance to a destination and if so, transmit further communications that are relevant to the user's proximity where the further communication may also include an assigned timer value unique to the user based on certain factors. The system and/or the device locally (via processor and memory of the UE device) may then determine if that user's distance to the destination has changed subsequent to receiving the communication and whether that change results in a net reduction in the distance between the user and the destination. If that is determined to be the case, then the system and/or device may make a determination locally or take action where, for example, additional time is added to the timer value without knowing the exact GPS location of the UE. Accordingly, via an application running on the user equipment, the system may determine whether the user may have a more likely intention to accept or redeem the transmitted communication. Furthermore, the unique increase and decrease of the timer value may depend on the user's actions and thereby, reward the user by allocating more time for them to get to the destination location, e.g., provider. For example, one result of the added time to the timer may be to ensure the safety of the user in the event that they begin to travel toward the provider's location or direction. That is, a user may be rewarded with a unique timer or additional time that is conducive for safer travelling. The system may achieve this by way of determining a unique timer that is assigned to each user equipment and where the value increase may be determined based on the proximity of the UE to the destination location, how quickly the proximity and distance to the destination location is reduced, and expiration of the communication, e.g., promotion end or closing time of the destination.

Each unique timer and amount of time added (or subtracted) that are both associated with a UE may be unique and be determined based on a number of factors, such as: amount of time to the termination of the promotional offer by the provider, time remaining to the closing of the provider, number or capacity of the available offers, distance range of the UE to the provider, prior acceptance of the notification associated with the promotional offer, historical data showing movement of the UE, and/or any combination of the above. Accordingly, the timer assigned initially to the UE and the amount of time added to the timer may both be unique to the user at the UE and provide a personalized and tailored experience. In addition to the above, the system may determine a time of delivery for the notification based on a number of factors, which in addition to the aforementioned factors, may also include time of day, prior history of visitation to the provider's location by the UE, prior history of redeemed offers, and/or the UE's ability to travel such prior distances (for example, does the user only own a bike and can travel at 15-20 miles/hour or a car which can travel at higher speeds). Additionally, because each UE may have started with a different timer value and at a different time, inherently, the timers are unique to each user at the UE.

In one embodiment, the UE device may locally determine when the notification is to be delivered at the display of the UE based on having received the associated notification information and offer from the provider. In this embodiment, the need for having a server computing device may be eliminated in that distance information, e.g., proximity confirmations, would not be transmitted between the server and client devices. The UE device may determine locally whether the UE itself is within a specified proximity to the location of the provider once the UE receives the distance information of the provider and further not need or have access to any GPS specific location data at the UE.

In another embodiment, the server may transmit a first communication which may include all the necessary information for the UE to take over the processing of the disclosed methods. That is, the server may transmit a first communication signal based on receiving a request from a provider, where the first communication signal may include: distance information related to the provider, the notification from the provider that is to be communicated to the user at the UE, length of time the notification is to be valid, delay between confirming UE proximity to location of provider, etc. In this embodiment, the UE, based on receiving the first communication from the server, determines locally via the processor and addressable memory at the UE, and whether the current GPS location is within a distance to reach the location of the provider before the timer expires; and hence start the timer. The UE may then at a time subsequent to having checked the proximity of the UE to the location of the provider, make a second determination for whether the distance to the location of the provider has been reduced indicating that after a certain period of time the UE has moved toward the location of the provider. The UE may then locally increase the timer to allow the user more time to reach the location of the provider.

In the above disclosed embodiments, the UE may still need to confirm with the server to determine what promotional offers are available while determining the proximity information locally at the UE and accordingly, based on the information determine whether or not to display the notification. Thereafter, the UE may determine if movement to a closer proximity to the provider than previously in time has occurred and then request the server provide the additional timer information which may include additional time to be added to the timer. Accordingly, the disclosed embodiments allow the system to transmit communications, e.g., an offer, to users within a certain area without knowing their exact location and providing the option to a goods/service provider, e.g., merchant, to determine at what point the provider wants the consumer to actually be notified via their UE.

Such embodiments provide a method and system to communicate with users who are within an area that can meet the time restrictions of reaching the destination location without knowing where they are. Additionally, the system determines a set of UEs without knowing where they are and allow a service provider to notify the UEs based on time restriction and type of movement (e.g., stationary or moving). For example, if the UE's movement shows they are not stationary and/or getting closer to the service provider's location (destination location) the timer may be increased.

The above embodiment utilizing locally executed processes at the UE, provides the user at the UE privacy protections since the location is not shared with outside devices and not stored or used in any other way. The UE receives the location of the provider and the EU transmits the distance from the provider's location as the distance changes. As such, proximity or distance to the provider's location (not the location of the UE) determines if and when the communication is going to be delivered. In one embodiment, the sending of the communication which may include the notification to the user at the UE may be customizable based on a request or provided settings from the service provider.

In one embodiment, distance information may be obtained by way of the server transmitting a communication to each of the UE within a group or set, asking whether they are within a certain distance from the location of the provider. If the response from the UE is in the positive, the server may then determine a subset of UEs to which the server transmits a second communication including information about the provider and potential offerings. In some embodiments, the server may not require a response and within a predetermined amount of time (based on how much time the offer is to last), send a third communication to ask whether the UE is within a distance that is less than the original distance (first transmitted communication) and if the response is in the positive, the server may increase the time value giving the UE more time to get to the location of the provider.

In one embodiment, the need to request exact information data from a UE is eliminated and a user's privacy and location at the UE is protected. That is, the server may only send a request to the UE to determine whether they are within a distance from a provider's location. For example, the server may transmit a request to the UE to respond with a flag set to 1 or 0 based on determining locally at the UE whether the UE is within X number of miles from an address (via GPS location using Latitude and Longitude). In this embodiment, the UE may compare its own GPS location with the provider's GPS location and if the distance is within X miles, respond with "1" for Yes or "0" for No. At the second request for location determination, the server may use the same method and transmit a request to the UE to respond with a flag based on determining locally at the UE whether the UE is within X minus an absolute value (Y) number of miles from the same address of the provider. The server may use the second response to determine whether the UE has moved closer to the provider's location or not. This determination is based on whether (a) the first response is in the positive and the second response is in the negative indicating that either the UE has not moved or moved farther from the provider location, or (b) the first response is in the positive and the second response is in the positive indicating that the UE has moved closer to the provider location, or (c) if the first response is in the negative that the UE is not within the required distance from the location for there to be a need to send a second request. In embodiments using the above method of determining distance from a location (and not actual distance information of the UE), the server may be configured to determine a subset of users that may qualify to have their timer extended.

The techniques introduced below may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIGS. 1-8 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

FIG. 1 depicts an exemplary embodiment of a computing system 100 including user equipment (UE) or user computing device having an ability to transmit and receive signals wirelessly, a plurality of wireless local area network devices (WLANs) 120, 125, a networked computing device 140 that may host a virtual network computing server, and a Wide Area Network (WAN) 150 that may provide access to the Internet or other content sources. In some embodiments, for example, a connection 130 may be established between WLANs 120,125 and the networked computing device 140. In some embodiments, the networked computing device 140 may be connected to the WAN 150 and have access to the World Wide Web (Internet). The networked computing device 140 may be operably coupled to the WAN network 150 and may communicate with each other via various means, including, for example, wired or wireless network segments, such as radio frequency, infrared, and/or microwave. In some embodiments, various protocols and programming languages may also be used, such as transmission control protocol (TCP) over Internet Protocol (IP)—TCP/IP, User Datagram Protocol (UDP) with multi-cast data communication plans, Real Time Protocol (RTP) for data streaming, hypertext transfer protocol (HTTP) with hypertext markup language (HTML), simple object access protocol (SOAP) with extensible markup language (XML), and other communication means adapted to operably connect the networked computing device 140 with the other devices within the computing system 100.

The disclosed methods and systems provide a constantly updating of a subset (of users via their user equipment device) based on changing of proximity (location) by way of creating/determining subsets of those user equipment devices that are getting closer to the location of the provider or destination and determining which users stay in the subset and which timer increases are initiated. That is different subsets are determined based on distance away from a location of a provider and different user equipment get their timer increased according to how closer they are getting to the location of the provider. For the user equipment devices that are not getting closer, the timer keeps going; once timer runs out, they are removed from the subset. Accordingly, the system maintains and determines multiple subsets, where: (i) some timers are increasing by a larger amount when compared to others; (ii) some timers are increasing by smaller amount when compared to others; (iii) some timers are not changed; and (iv) some user equipment are removed from the subset because timer expired.

Figure 2A:
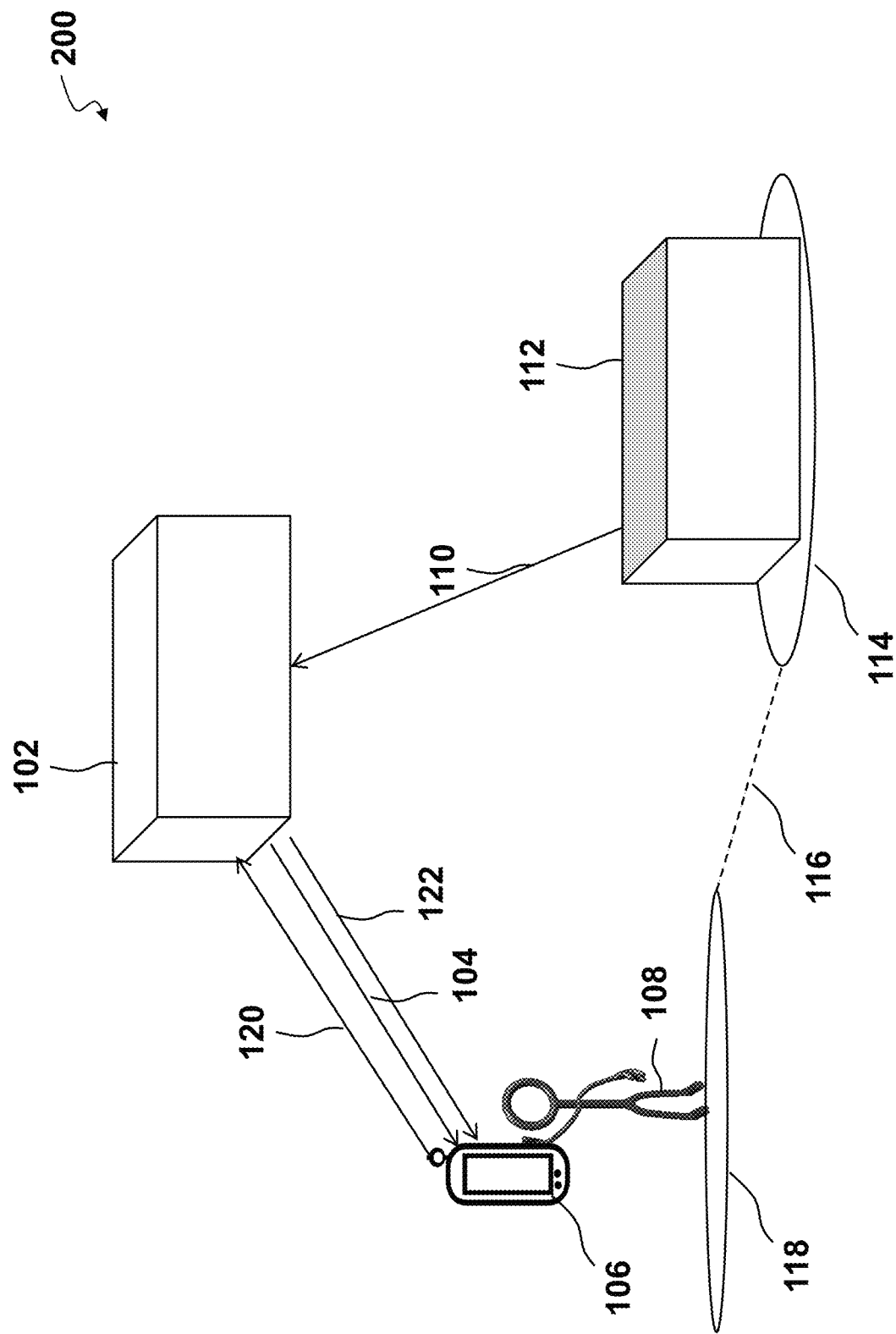
FIG. 2 depicts the system of FIG. 1 further configured for determining a user's later location relative to a destination.

With respect to FIG. 2A, a system 100 is depicted for determining a user's location relative to a destination, in order to transmit further communications that are relevant to the user's proximity. As disclosed, the method and system embodiments provide transmitting, by a server computing device 102, a first signal transmission 104 to a user equipment 106 of a user 108 signed up to communicate with the server 102, where the first signal 104 is transmitted based on a received request 110 from a provider 112. That is, a provider 112 may initiate the process by transmitting a request 110 to the server 102 whereby the request 110 is to communicate a notification to a set of users signed up for receiving messages associated with the provider 112. Accordingly, a broadcast and/or push notification of a first signal transmission 104 comprising a request is initiated by the server 102 based on the received request 110 from the provider where the transmission comprising the request is transmitted to all the users that are part of the set of users signed up for receiving messages.

In one embodiment, the user 108 that is part of a set of users, receives the transmitted first signal 104 at the user equipment 106, and the transmitted first signal 104 may comprise a location 114 of the provider and request of whether the UE is within a specific distance from the provider's location 114. The transmitted first signal 104 may also include a first specified distance 116 between the provider 112 and a location 118 of the user 108.

In one embodiment, the user 108 may transmitting a response 120 with the user equipment 106 to the server computing device 102 indicating whether the user equipment 106 is located within the specified distance 116 from the provider 112. Subsequently, the server computing device 102 may determine a subset of user equipment that are within the specified distance 116 based on the received response 120. Accordingly, at an initial step the server transmits/sends a signal to all the users within a complete set who are signed up with the service and that are in the area, then the server computing device may determine a subset of users from the full set of users based on who are within a proximity distance from the provider.

In one embodiment, a second signal 122 or notification may then be transmitted/sent to the users of the previously determined subset of users informing them of a particular communication, e.g., event or promotion. In one example, the second signal 122 may include a "call to action" or "information" for the users of the subset of users to consider and decide whether they are interested in receiving further communications.

In one embodiment, the second signal 122 transmitted/sent to the users of the previously determined subset of users may also include a timer value which will indicate a countdown of a specified time interval giving the user equipment a measured amount of time to get to the location of the provider. The timer value may be based on a number of factors, for example, the time remaining for the provider to make such an offering, the time remaining till closing of the venue of the provider, the availability of the offering by the provider, and/or the user's prior history in responding to similar notifications.

In one embodiment, if the system or the server determines that the user equipment is in a closer location to the location of the provider at a later time, then they receive a second updated message where the updated message may include an increase to the timer value and/or further information about the communicated notification. That is, change in physical location of the user equipment in relation to the actual location of the offer (destination) may trigger an update to the timer value where more time is given to the user based on their change in location or user engagement.

Figure 2B:
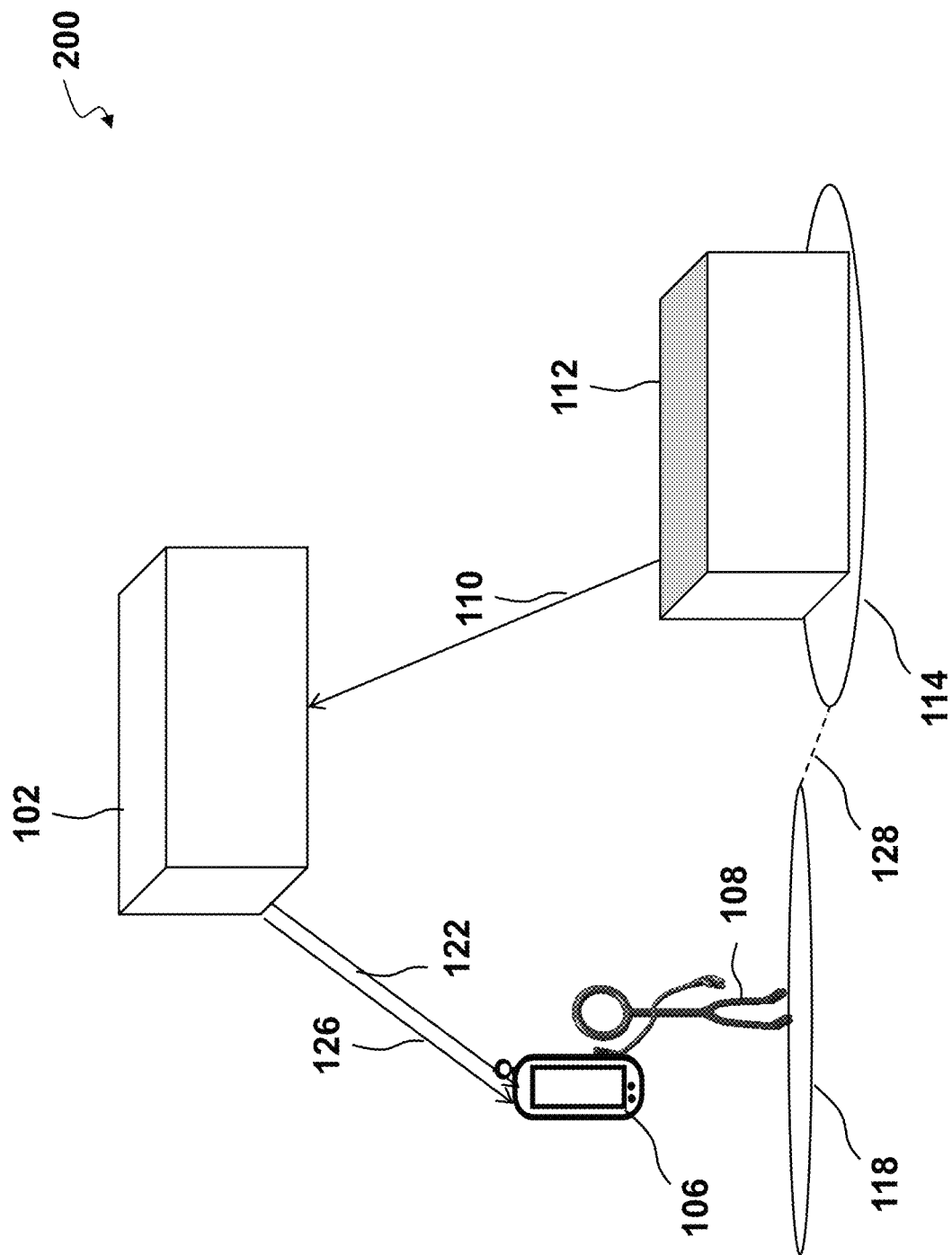

With respect to FIG. 2B, the server computing device 102 may transmit a second signal 122 to the subset of user equipment, the signal 122 comprising information about the provider 112 and a specified amount of time to serve as a countdown timer. In one embodiment, the server computing device 102 may transmit a third signal 126 to the subset of user equipment, the transmitted third signal 126 comprising the location 112 of the provider and a second specified distance 128, where the second specified distance 128 is smaller than the first specified distance 116. The user equipment 106 may then transmit a response indicating whether the user equipment is located within the specified second distance from the provider, where the second distance may be for a distance that is less than the first distance. The server computing device may now determine a second subset of user equipment that are within the specified distance based on the received response and by adding user equipment 106 to the updated second subset. Optionally, the server computing device may transmit to user equipment 106 of the second subset of user equipment, a fourth signal comprising a second specified amount of time to be added to the previously running countdown timer thereby increasing the time to expiration if a user equipment was at a distance from the provider that is less than the previously reported distance. Subsequently, the server computing device may determine an update to the second subset based on determining if the count timer has expired for user equipment 106 and removing that user equipment from the second subset.

Figure 3A:
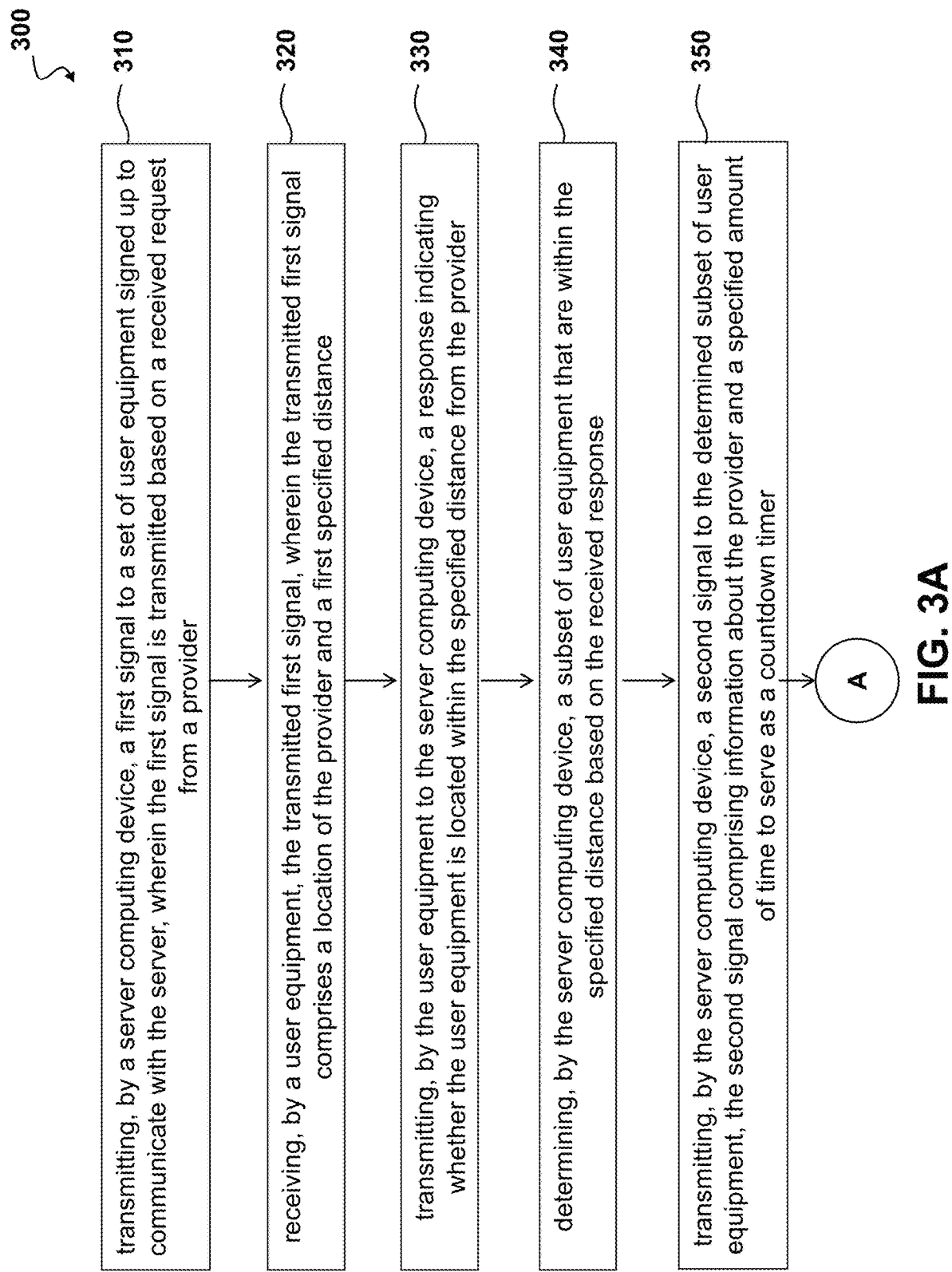
FIGS. 3A-3B depict a flowchart of a method for determining a user's location relative to a destination.
Figure 3B:
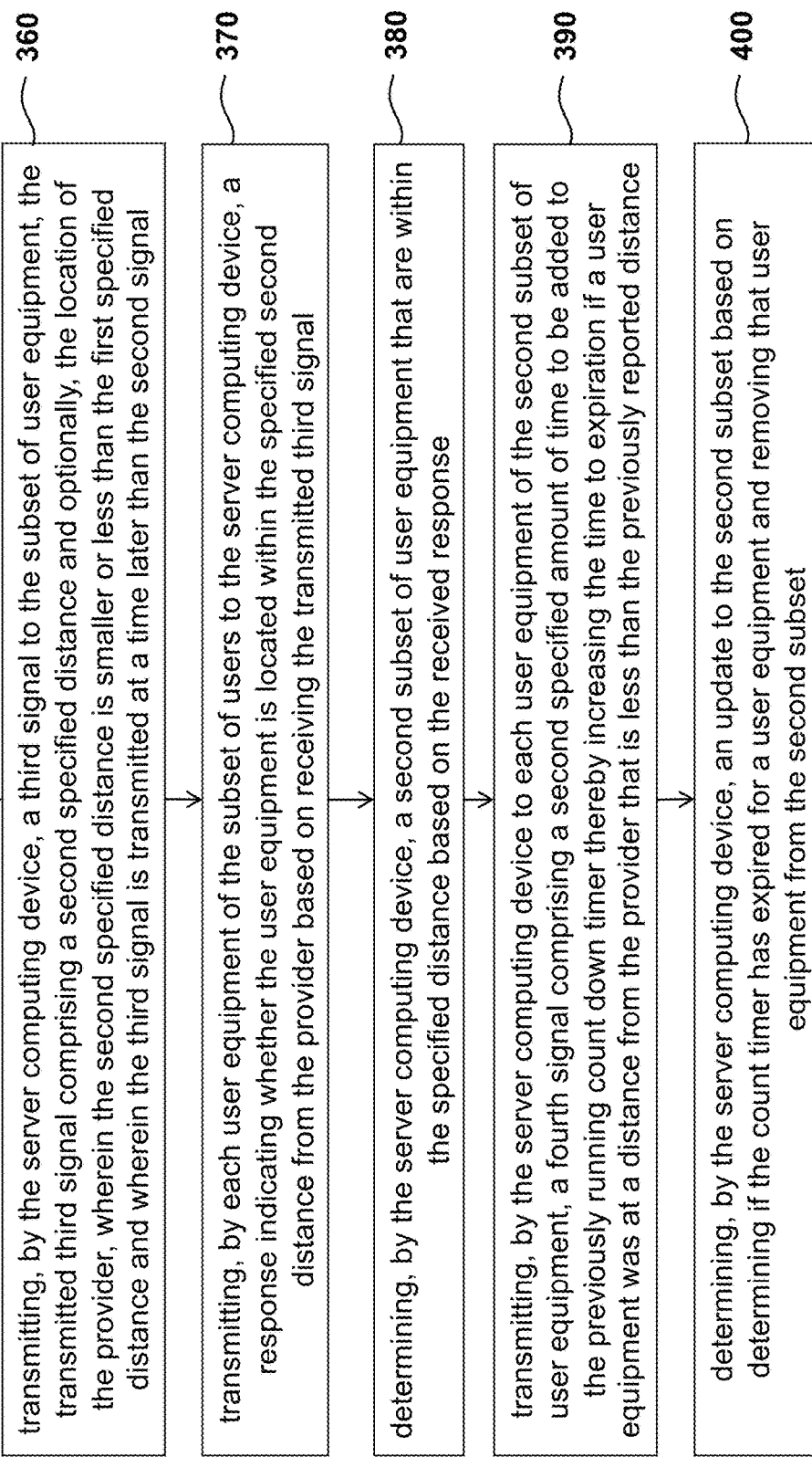

FIGS. 3A-3B depict embodiments that may include an exemplary method of implementation of a server computing device 300 performing notification delivery to relevant user equipment and identification of users who should have their timer extended. The exemplary method of the system and associated computing devices may comprise the following steps: transmitting, by a server computing device, a first signal or a notification to a set of user equipment signed up to communicate with the server, where the first signal is transmitted based on a received request from a provider (step 310); receiving, by a user equipment, the transmitted first signal, where the transmitted first signal comprises a location of the provider and a first specified distance or proximity (step 320); transmitting, by the user equipment to the server computing device, a response indicating whether the user equipment is located within the specified distance or proximity from the location of the provider (step 330); determining, by the server computing device, a subset of user equipment that are within the specified distance based on the received response (step 340); transmitting, by the server computing device, a second signal to the determined subset of user equipment, the second signal comprising information about the provider and a specified amount of time to serve as a countdown timer (step 350); transmitting, by the server computing device, a third signal to the subset of user equipment, the transmitted third signal comprising a second specified distance and optionally, the location of the provider, where the second specified distance is smaller or less than the first specified distance and where the third signal is transmitted at a time later than the second signal (step 360); transmitting, by each user equipment of the subset of users to the server computing device, a response indicating whether the user equipment is located within the specified second distance from the provider based on receiving the transmitted third signal (step 370); determining, by the server computing device, a second subset of user equipment that are within the specified distance based on the received response (step 380); transmitting, by the server computing device to each user equipment of the second subset of user equipment, a fourth signal comprising a second specified amount of time to be added to the previously running countdown timer thereby increasing the time to expiration if a user equipment was at a distance from the provider that is less than the previously reported distance (step 390); and determining, by the server computing device, an update to the second subset based on determining if the count timer has expired for a user equipment and removing that user equipment from the second subset (step 400).

Figure 4:
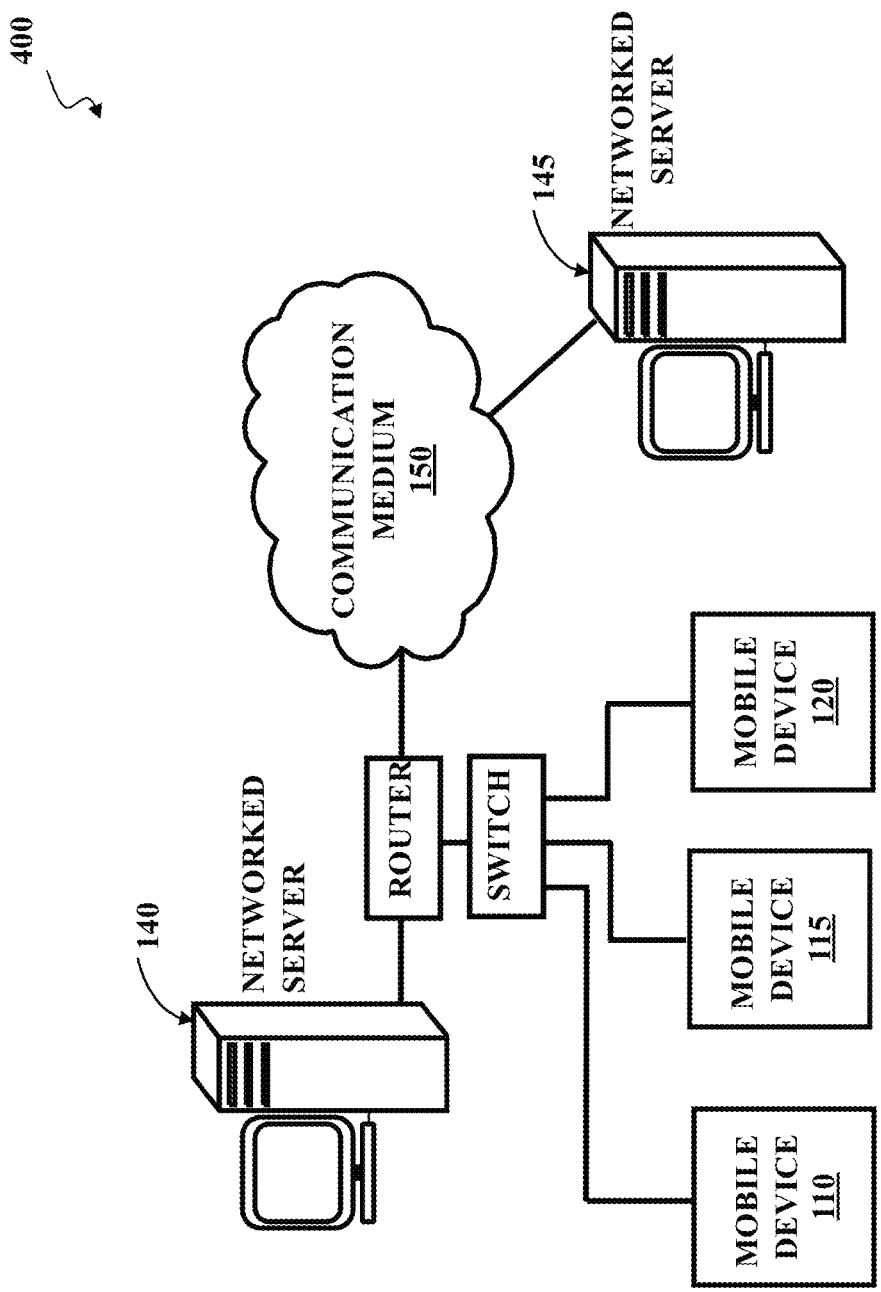
FIG. 4 depicts, in a functional block diagram, multiple networked servers communicating with a set of client devices via a communication medium.

FIG. 4 depicts a computing system where a number of mobile devices 110, 115, 120 are in communication with a number of networked servers 140, 145. In one embodiment, the networked servers 140, 145 may be accessible via the internet and so the mobile devices may receive push notification having related data and attributes associated with a provider via a switch and router (if connected via Wi-Fi) from the network server 140 upon the server receiving a request from the provider. Once the networked servers 140, 145 receive and process the request and responses from the mobile devices 110, 115, 120, they may then perform the steps disclosed herein. Since the networked server 140 is in communication with the networked server 145 via a communication medium 150, they may share resources for faster processing and also communicate with the mobile devices faster. That is, if the networked server 145 determines which users should be receiving the notification—after they have been determined to be part of the subset, to the networked server 145—it may then push the notification and timer to the selected users using the networked server 140 it is in communication with. For example, mobile devices 110 and 120 may receive a notification and respond to the networked server 145. Once determined that the users of mobile device 115 and mobile device 120 are in the proximity of the provider, the networked servers 140, 145 may then push the notification and timer, to the users so that they are made aware of the offer and time left on the offer to be accessible for them to view or complete on their user device at the location of the provider.

Typically, the servers perform assigning of a unique serial number in order to track the users in a subset. In one embodiment, the serial number may be in the form of a Model Number/Serial Number, Wi-Fi Address/Bluetooth ID/Modem Firmware or MAC Address/SEID/EID/IMEI/ICCID/MEID/IMEI/or any other easily accessible and unique identifier of the user equipment device. Serial numbers for user purposes typically represent a unique number associated with each user equipment device that is to be processed and stored on the server or on the user device itself. Additionally, a unique serial number may be assigned to each notification or offer—even if not identified—to be available for that user equipment at the time it was being assigned. The digits of the serial number, when taken together, are not necessarily selected to communicate a meaning other than that of being a unique number to facilitate searching and identifying user equipment devices and the subsets they are in. This function may be accomplished in real-time against the server or at a later time when internet access is available to the client device. In an environment where an internet connection is not available, other modes of validation may be used to validate the proximity or distance, such as by the application running on the mobile device and executing the steps identified in this application as being executed by the server computing device. That is, the user equipment devices may be configured to receive a notification from the server computing device and thereafter execute the steps to determine if the user equipment (1) is within a distance or proximity to the location of the provider; (2) has moved closer to the location of the provider after lapse of some predetermined time; (3) still has a valid timer and the timer has not expired.

Embodiments of the computing system 400 also include a computer server hosted on a computing device comprising a processing unit and addressable memory, where the computer server may comprise: (a) a parsing component for analyzing and parsing a set of information input as relative information associated with a notification; (b) a data processing component for determining a value or unique serial number representing an association with the user or device based on the parsed information; and (c) communicating with the computing device the recognized information, where the recognized information may comprise identification of users who have already created an account and signed up for the service or alternatively, of unknown users who have yet to create an account and upload their initial information if the device is on the premises of the provider.

Figure 5:
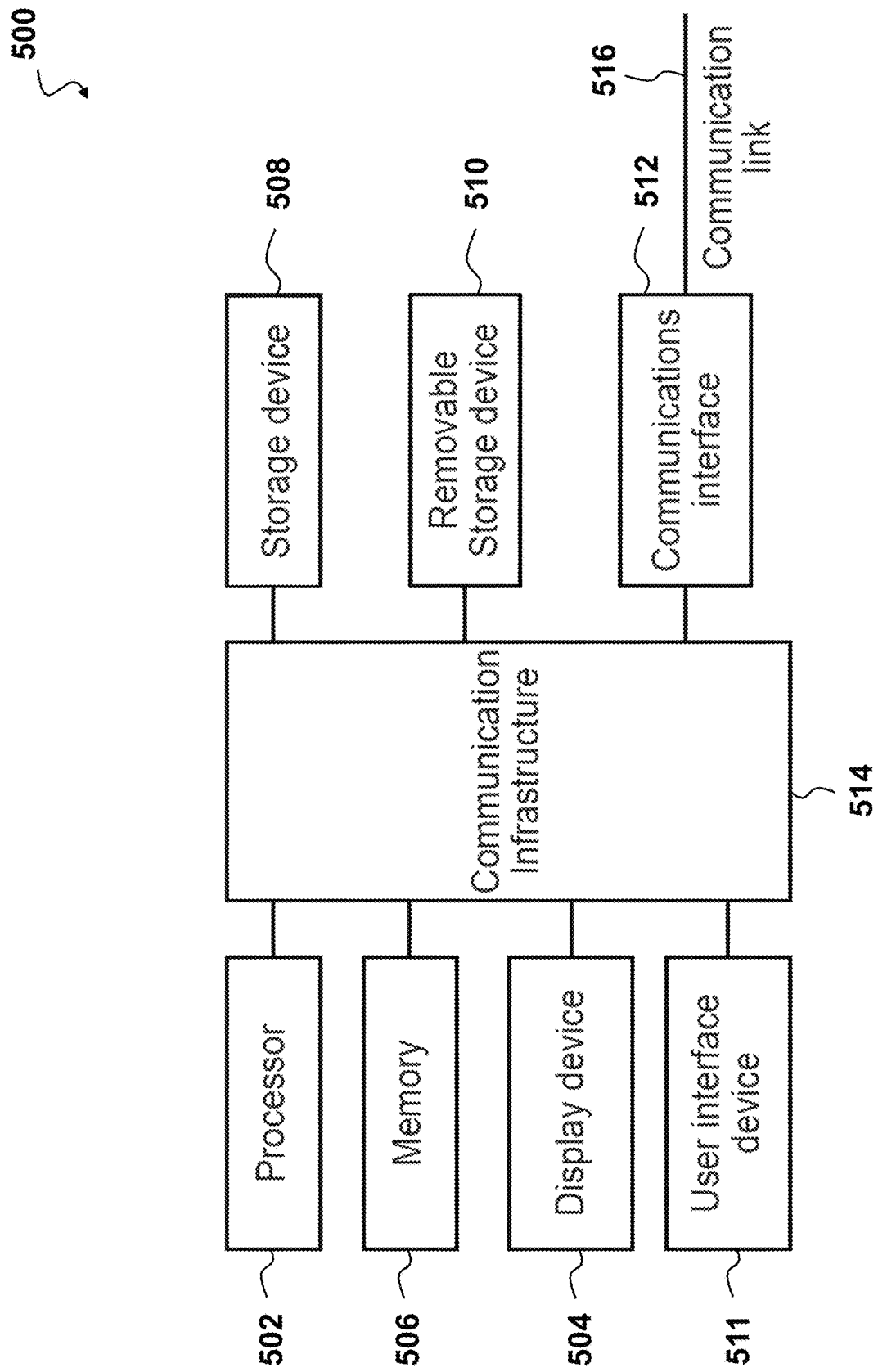
FIG. 5 shows a high-level block diagram and process of a computing system for implementing an embodiment of the system and process.

FIG. 5 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 6:
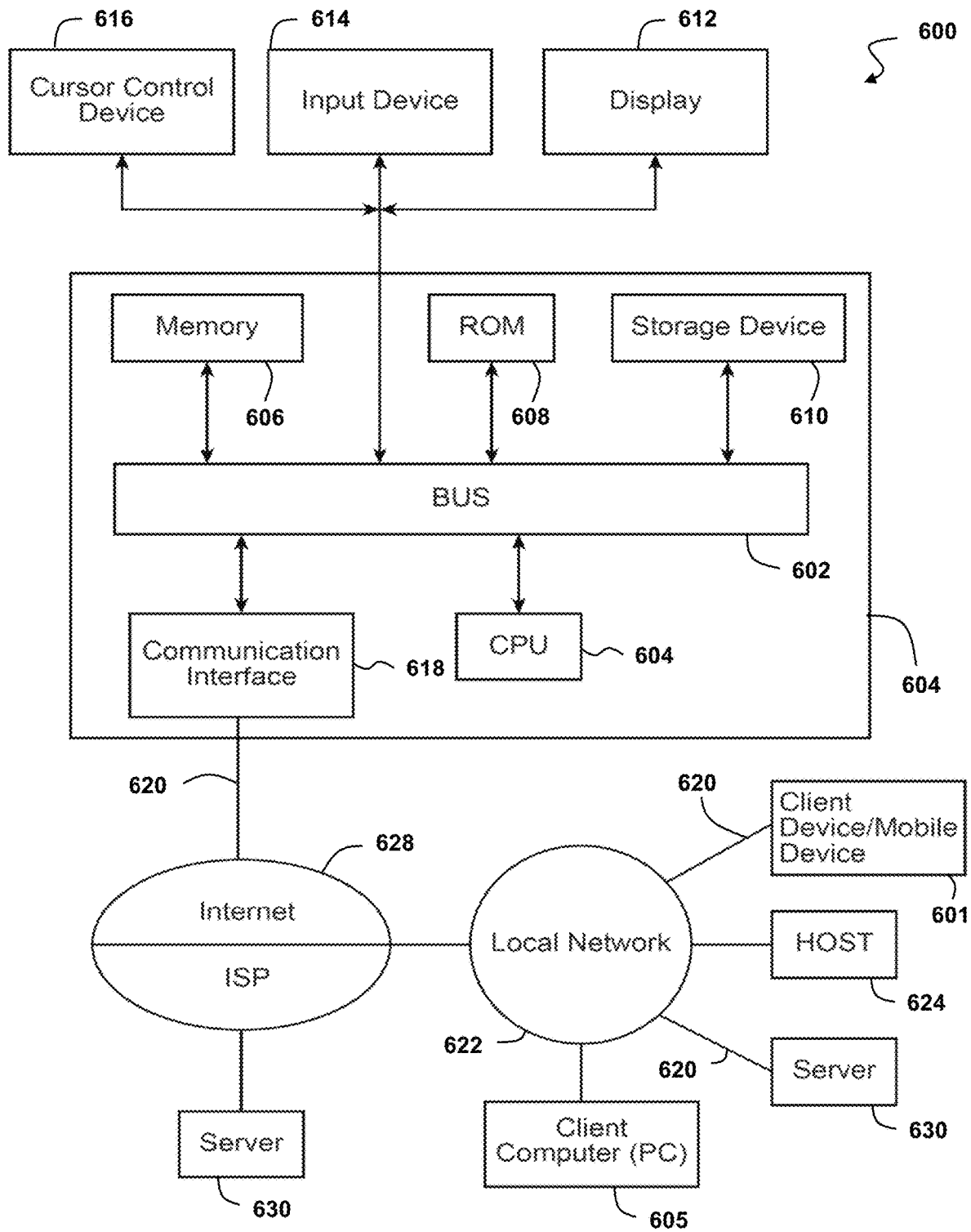
FIG. 6 shows a block diagram and process of an exemplary system in which an embodiment may be implemented.

FIG. 6 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 7:
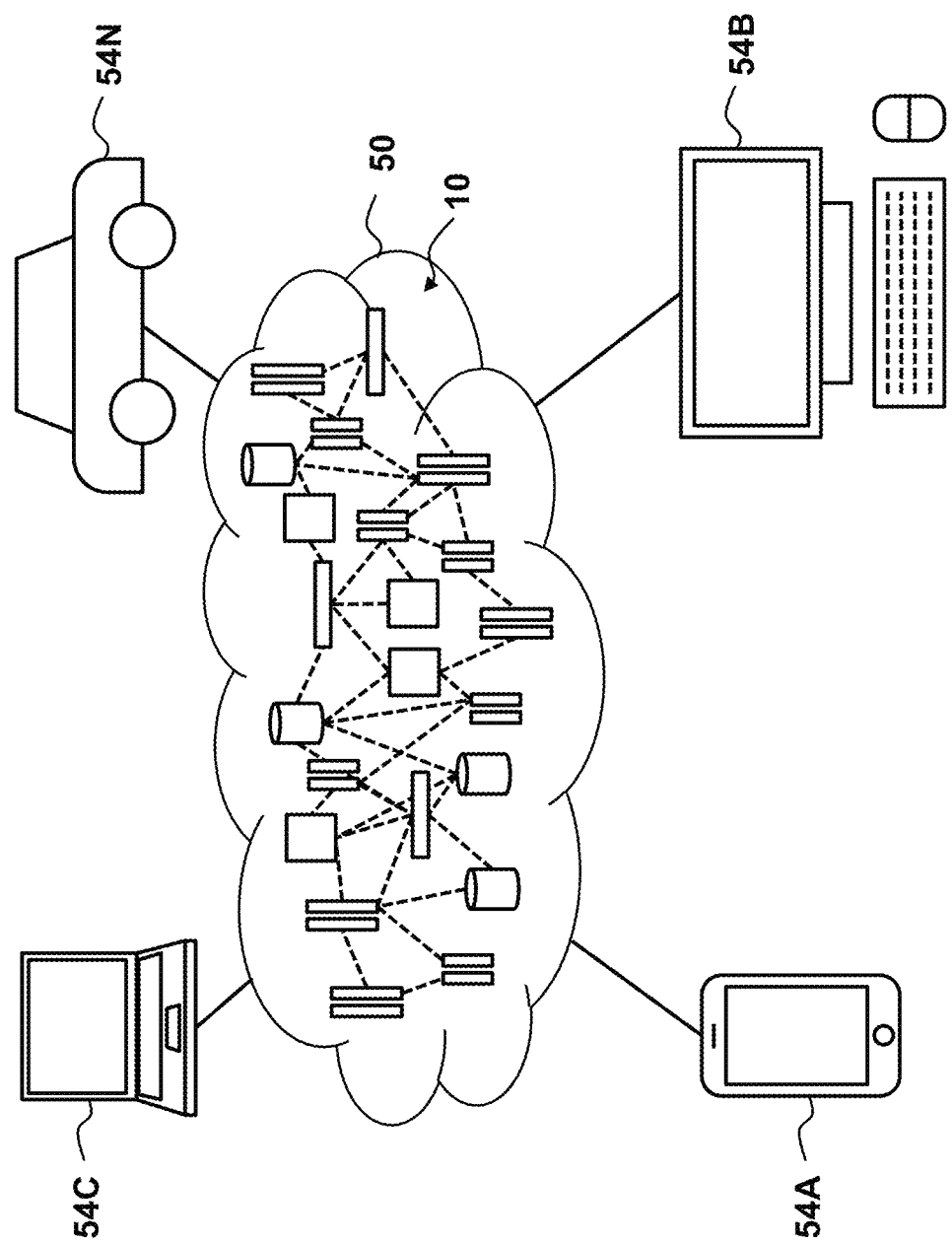
FIG. 7 depicts a cloud computing environment for implementing an embodiment of the system and process disclosed herein.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
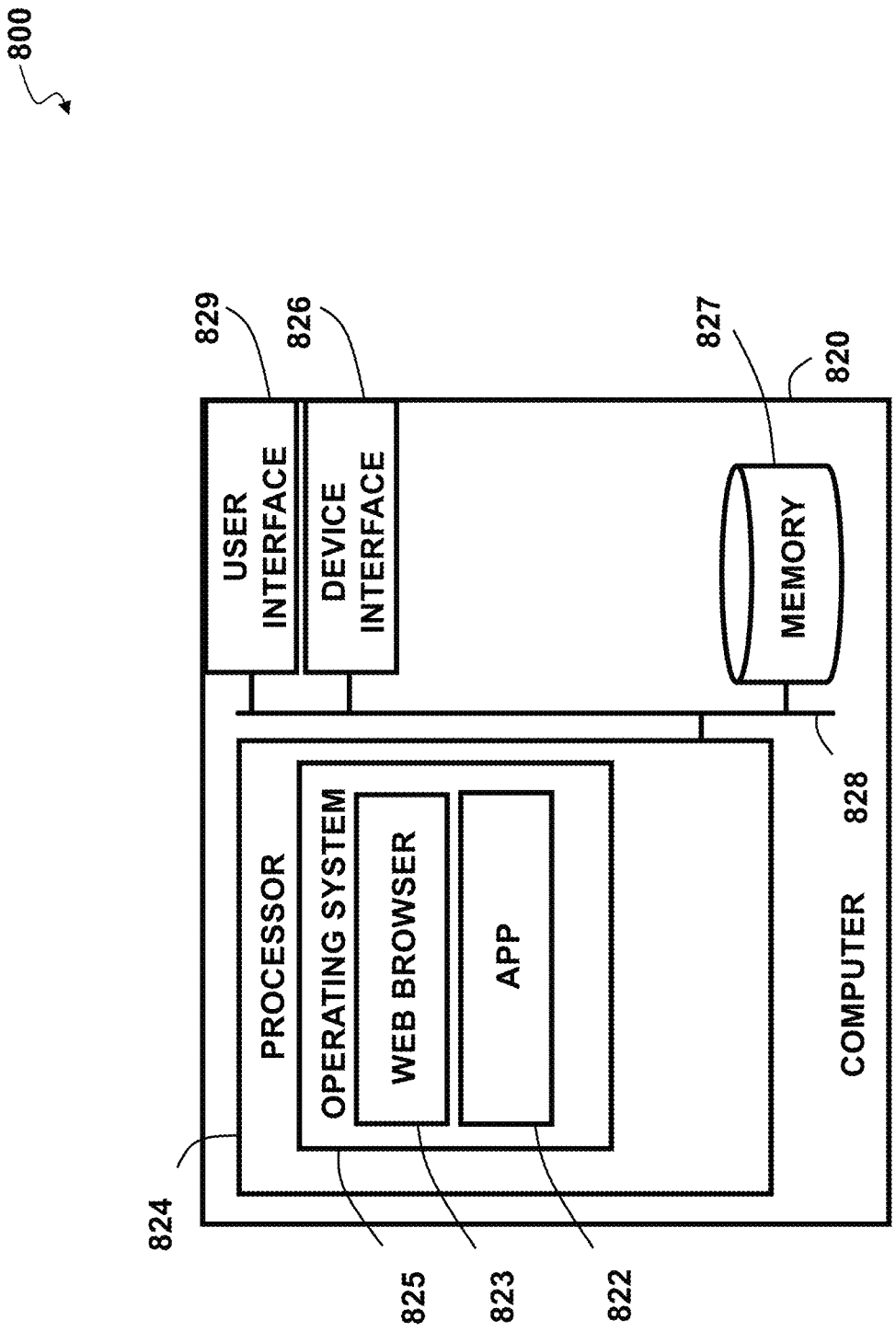
FIG. 8 illustrates an example of a top-level functional block diagram of a computing device embodiment.

FIG. 8 illustrates an example of a top-level functional block diagram of a computing device embodiment 800. The example operating environment is shown as a computing device 820 comprising a processor 824, such as a central processing unit (CPU), addressable memory 827, an external device interface 826, e.g., an optional universal serial bus port and related processing, and/or an Ethernet port and related processing, and an optional user interface 829, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 820, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 828. In some embodiments, via an operating system 825 such as one supporting a web browser 823 and applications 822, the processor 824 may be configured to execute steps of a process establishing a communication channel and processing according to the embodiments described above.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
   transmitting, by a server computing device having a processor and addressable memory, a first signal to a set of user equipment signed up to communicate with the server, wherein the first signal is transmitted based on a received request from a provider;
   receiving, by a user equipment, the transmitted first signal, wherein the transmitted first signal comprises a location of the provider and a first specified distance;
   transmitting, by the user equipment to the server computing device, a response indicating whether the user equipment is located within the first specified distance from the provider;
   determining, by the server computing device, a subset of user equipment that are within the first specified distance based on the received response;
   transmitting, by the server computing device, a second signal to the determined subset of user equipment, the transmitted second signal comprising information about the provider and a specified amount of time to serve as a countdown timer;
   transmitting, by the server computing device, a third signal to the subset of user equipment, the transmitted third signal comprising the location of the provider and a second specified distance, wherein the second specified distance is smaller than the first specified distance;
   receiving, by each user equipment of the subset of user equipment, the transmitted third signal while the received countdown timer is still running;
   transmitting, by each user equipment of the subset of user equipment to the server computing device, a response indicating whether the user equipment is located within the second specified distance from the provider;
   determining, by the server computing device, a second subset of user equipment that are within the second specified distance based on the received response and based on the countdown timer of the user equipment not having expired; and
   transmitting, by the server computing device to each user equipment of the second subset of user equipment, a fourth signal comprising a second specified amount of time to be added to the running countdown timer thereby increasing the time to expiration if a user equipment was at a distance from the provider that is less than a previously reported distance.

2. The method of claim 1, further comprising:
   determining, by the server computing device, an update to the second subset based on determining if the countdown timer has expired for a user equipment and removing that user equipment from the second subset.

3. The method of claim 2, wherein the update to the second subset ensures the server communicates with users who are within an area that can meet time restrictions of reaching the provider location without knowing where each of the user equipment is located.

4. The method of claim 1, wherein the countdown timer is a length of time the notification is to be valid.

5. The method of claim 1, wherein the first signal comprises a value for amount of time to delay between confirming user equipment proximity to location of provider.

6. The method of claim 1, further comprising:
   determining if the user equipment has moved via comparing the first distance to the provider against the second distance to the provider.

7. A system comprising:
   a set of user equipment each having a processor and addressable memory;
   a server computing device having a processor and addressable memory, the processor configured to:
   transmit a first signal to a set of user equipment signed up to communicate with the server, wherein the first signal is transmitted based on a received request from a provider and wherein the transmitted first signal comprises a location of the provider and a first specified distance;
   determine a subset of user equipment that are within the first specified distance based on a received response indicating whether the user equipment is located within the first specified distance from the provider;
   transmit a second signal to the determined subset of user equipment, the transmitted second signal comprising information about the provider and a specified amount of time to serve as a countdown timer;
   transmit a third signal to the subset of user equipment, the transmitted third signal comprising the location of the provider and a second specified distance, wherein the second specified distance is smaller than the first specified distance;
   determine a second subset of user equipment that are within the second specified distance based on a received response indicating whether the user equipment is located within the second specified distance from the provider and based on the countdown timer of the user equipment not having expired; and
   transmit to each user equipment of the second subset of user equipment, a fourth signal comprising a second specified amount of time to be added to the running countdown timer thereby increasing the time to expiration if a user equipment was at a distance from the provider that is less than a previously reported distance.

8. The system of claim 7, wherein the server computing device is further configured to:
   determine an update to the second subset based on determining if the countdown timer has expired for a user equipment and removing that user equipment from the second subset.

9. The system of claim 8, wherein the update to the second subset ensures the server communicates with users who are within an area that can meet time restrictions of reaching the provider location without knowing where each of the user equipment is located.

10. The system of claim 7, wherein the countdown timer is a length of time the notification is to be valid.

11. The system of claim 7, wherein the first signal comprises a value for amount of time to delay between confirming user equipment proximity to location of provider.

12. The system of claim 7, wherein the server computing device is further configured to:
   determine if the user equipment has moved via comparing the first distance to the provider against the second distance to the provider.

13. A user equipment device having a processor and addressable memory, wherein the processor is configured to:
   receive a transmitted first signal, wherein the first signal is transmitted based on a received request from a provider and wherein the transmitted first signal comprises a location of the provider and a first specified distance;
   transmit a response to a server computing device indicating whether the user equipment is located within the first specified distance from the provider;
   determine whether the user equipment is part of a subset of equipment if the user equipment is within the first specified distance;
   receive a second signal comprising information about the provider and a specified amount of time to serve as a countdown timer and initiate the countdown timer;
   receive a third signal comprising the location of the provider and a second specified distance, wherein the second specified distance is smaller than the first specified distance, while the countdown timer is still running;
   transmit a response indicating whether the user equipment is located within the second specified distance from the provider;
   determine whether the user equipment is part of a second subset of user equipment based on if the user equipment is within the second specified distance and based on the countdown timer of the user equipment not having expired; and
   receive, if the user equipment is part of the second subset of user equipment, a fourth signal comprising a second specified amount of time to be added to the running countdown timer thereby increasing the time to expiration since the user equipment was at a distance from the provider that is less than a previously reported distance.

14. The user equipment device of claim 13, wherein the user equipment device is further configured to:
   transmit a signal to be removed from the second subset based on determining if the countdown timer has expired.

15. The user equipment device of claim 14, wherein the update to the second subset ensures communication are only with users who are within an area that can meet time restrictions of reaching the provider location without providing user equipment location information.

16. The user equipment device of claim 13, wherein the countdown timer is a length of time the notification is to be valid.

17. The user equipment device of claim 13, wherein the first signal comprises a value for amount of time to delay between confirming user equipment proximity to location of provider.

18. The user equipment device of claim 13, wherein the user equipment device is further configured to:
   determine if the user equipment has moved via comparing the first distance to the provider against the second distance to the provider.

* * * * *